United States Patent [19]

Ohba et al.

[11] 4,335,406
[45] Jun. 15, 1982

[54] SOLID-STATE IMAGING DEVICE

[75] Inventors: Shinya Ohba, Kokubunji; Masaharu Kubo, Hachioji; Iwao Takemoto, Tokyo; Shoji Hanamura, Kokubonji; Masakazu Aoki, Hachioji, all of Japan

[73] Assignee: Hitachi, Ltd., Tokyo, Japan

[21] Appl. No.: 163,298

[22] Filed: Jun. 26, 1980

[30] Foreign Application Priority Data

Jul. 2, 1979 [JP] Japan ................... 54-82630

[51] Int. Cl.³ ............................ H04N 3/15
[52] U.S. Cl. ................................ 358/213
[58] Field of Search ............ 358/213, 209, 212, 41, 358/44; 357/29–32, 24; 330/250, 291, 75, 86; 250/211 J, 211 R, 578

[56] References Cited

U.S. PATENT DOCUMENTS

| 4,011,442 | 3/1977 | Engeler | 358/213 |
| 4,084,190 | 4/1978 | Stein | 358/213 |
| 4,224,585 | 9/1980 | Tanaica | 358/213 |
| 4,240,116 | 12/1980 | Tomlinson | 358/213 |

Primary Examiner—Michael A. Masinick
Attorney, Agent, or Firm—Craig and Antonelli

[57] ABSTRACT

This invention provides a signal processing circuit of a solid-state imaging device utilizing discontinuous scanning pulses having fixed interval times, and with a fixed pattern noise-eliminating circuit of high performance. In the signal processing circuit of this invention, switching elements are disposed in a feedback circuit of a signal amplifier (for example, pre-amplifier) and at an output of the signal amplifier, whereby the fixed pattern noise is suppressed so as to attain a high signal-to-noise ratio.

6 Claims, 20 Drawing Figures

FIG. IA PRIOR ART
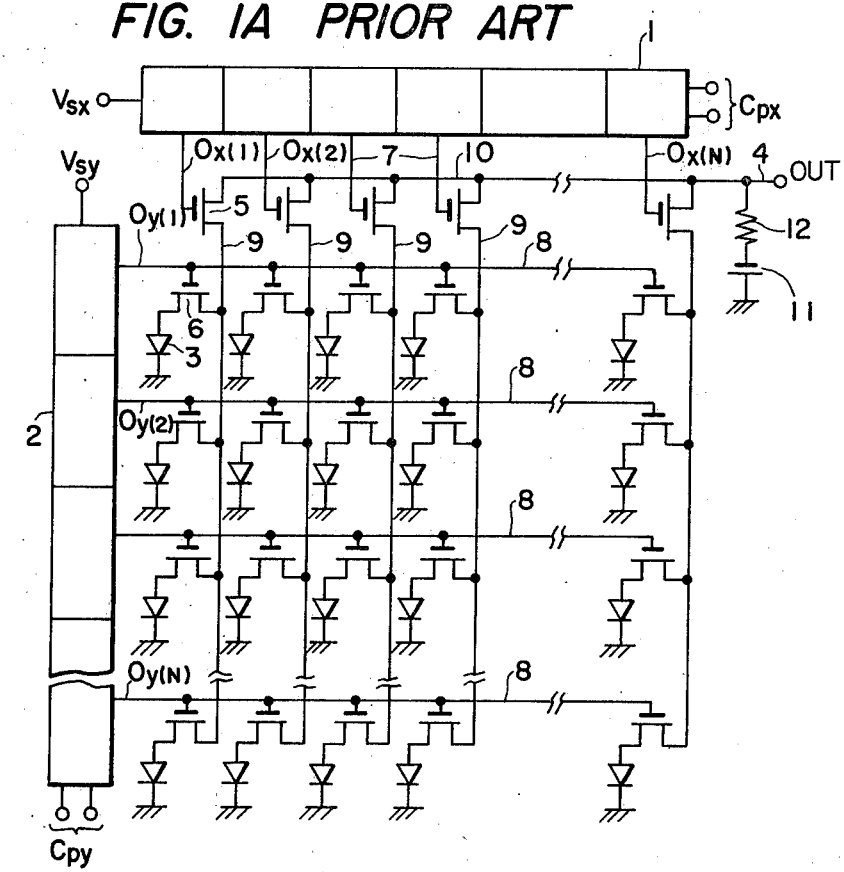
FIG. IB PRIOR ART
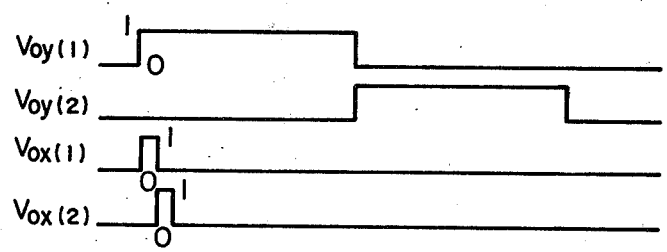

FIG. 6 PRIOR ART
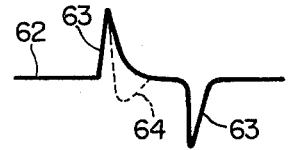
FIG. 7A
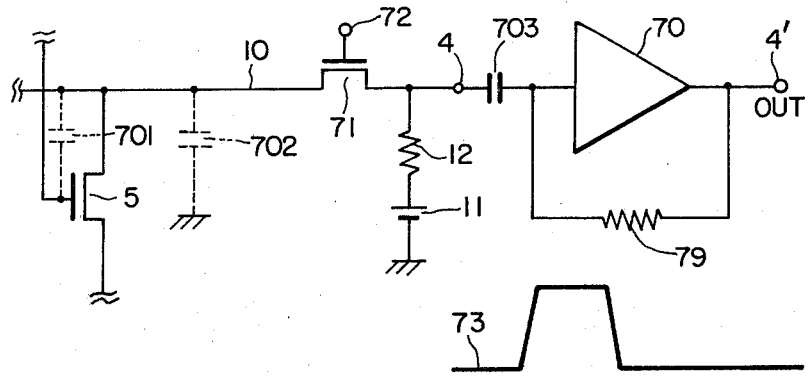
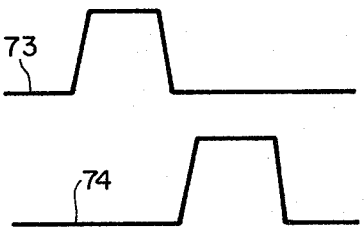
FIG. 7B
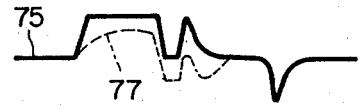

SOLID-STATE IMAGING DEVICE

BACKGROUND OF THE INVENTION

1. Field of the Invention

This invention relates to a solid-state imaging device for use in a television camera, etc. Particularly, it relates to a solid-state imaging device which has a plurality of picture elements disposed linearly or areally in a surface region of a semiconductor body. More specifically, it relates to a signal read-out circuit in the solid-state imaging device which has picture elements for reading out from photoelectric conversion elements photo information detected therein.

2. Description of the Prior Art

As a prior-art solid-state imaging device, there is one as shown by way of example in FIG. 1A.

FIG. 1A exemplifies the principle construction of a solid-state area sensor (imaging device), while FIG. 1B shows scanning pulses. In FIG. 1A, numerals 1 and 2 designate horizontal and vertical scanning circuits respectively. Usually, by applying clock pulses $CP_x$ and $CP_y$ in 2-4 phases, the scanning circuits 1 and 2 provide output lines 7 and 8 of their respective stages, that is, $O_{x(1)}$, $O_{x(2)}$ ... and $O_{y(1)}$, $O_{y(2)}$ ... with output pulses $V_{ox(1)}$, $V_{ox(2)}$ ... and $V_{oy(1)}$, $Y_{oy(2)}$ ... in which input pulses $V_{sx}$ and $V_{sy}$ have shifted by fixed timing intervals of the clocks. Using the scanning pulses, switching elements 5 and 6 are turned "on" and "off" one by one, to take out to a video output terminal 4 signals from individual photoelectric conversion elements 3 areally arrayed. Since the signals from the photoelectric conversion elements correspond to an optical image of an object projected thereon, video signals can be derived from the output end OUT (4) by the above operation.

In the solid-state imaging device of this type, in order to attain a high resolution, there are required about 500×500 photoelectric conversion elements and switching elements and scanning circuits each having a plurality of stages. To this end, the imaging device is ordinarily fabricated by the use of an integrated circuit technology (MOS-LSI technology) employing insulated-gate field effect transistors (MOS transistors) which can be highly integrated comparatively easily and in which a photoelectric conversion element and a switching element can be formed in an integral structure. FIG. 2 shows the structure of the photoelectric conversion element and the switching element which occupy most of the area of the sensor IC. Numeral 13 designates a semiconductor (Si or the like) body (semiconductor substrate, epitaxially grown layer, well diffused region, or the like). Numerals 5 and 6 indicate insulated-gate field effect transistors (MOS transistors) for addressing horizontal and vertical positions. They are made up of diffused layers 14, 15 and 16 forming their drains and sources and having a conductivity type opposite to that of the body, and gate electrodes 18 and 19 disposed through an insulating film ($SiO_2$ or the like). The source 14 of the vertical switching MOS transistor is utilized as a photodiode. The combination of the photodiode 14 and the vertical switching MOS transistor 6 is called the "picture element". When output pulses $V_{ox(N)}$ and $V_{oy(N)}$ from scanning circuits 1 and 2 utilizing, for example, shift registers constructed of MOS transistors are simultaneously applied to the gates of the switching MOS transistors through scanning lines $O_{x(N)}$ and $O_{y(N)}$, charges in a quantity having been discharged from the diode 14 at the addressed position in proportion to incident photons are charged from a voltage source for a video output 11. The charging current at that time is read out as a video signal from an output terminal OUT (4) through a load resistance 12.

In such prior-art device, however, a fixed pattern noise (abbreviated to "FPN") occurs by a cause to be stated below, and it is a fatal drawback.

FIG. 3A depicts the structure of FIG. 2 more simply. A part 13 is, for example, a Si body of the P-type conductivity, and a part 14 is one photodiode which is made of a diffusion layer of the $N^+$-type conductivity. A part 16 in FIG. 3A corresponds to the horizontal signal output line 10 shown in FIG. 1A, while a part 15 corresponds to the vertical signal output line 9 shown in FIG. 1A. The part 15 in FIG. 3A may well be separated into the two regions of the drain of a MOS transistor 6 and the source of a MOS transistor 5, the respective regions being connected by a metal such as aluminum.

FIGS. 3B to 3F illustrate channel potentials corresponding to FIG. 3A. Now that an N-channel type element is considered, the positive sense of the potential is downward.

In FIG. 3B, signal charges 31 are stored in the photodiode 14, and zero V is applied to the gate 18 of the vertical switching MOS transistor (hereinbelow, simply written "VTr") 6 and the gate 19 of the horizontal switching MOS transistor (hereinbelow, simply written "HTr") 5, so that both the transistors turn "off".

FIG. 3C shows the state in which the VTr 6 turns "on" and the signal charges spread under the gate 18 of the VTr 6 as well as in the vertical signal output line 15. FIG. 3D shows the potential at the time when also the HTr 5 turns "on" and the signal charges are spreading and delivering also to the horizontal signal output line 16. FIG. 3E shows the state in which the signal charges have been once read out and the respective potentials are reset to the video voltage $V_o$. In FIG. 3F, the HTr 5 turns "off" and a signal of the next picture element is being read out.

As seen from FIGS. 3E and 3F, some 32 of the signal charges are left behind under the gate 19 of the horizontal switching MOS transistor HTr 5, and they are delivered to the horizontal signal output line 16 from under the gate when the horizontal scanning pulse turns "off".

FIG. 4A shows an example of a shift register composed of inverters 41 and transfer MOS transistors 42 and having heretofore been known well, the shift register being a prior-art example of the horizontal scanning circuit.

As illustrated by a pulse timing chart in FIG. 4B, in the prior-art device, the time at which the n-th horizontal scanning pulse $V_{ox(n)}$ turns "off" and the time at which the succeeding (n+1)-th horizontal scanning pulse $V_{ox(n+1)}$ turns "on" are determined by the same trigger pulse of the horizontal clock pulse $\overline{\phi_{x2}}$.

More specifically, the time when the horizontal scanning pulse $V_{ox(n+1)}$ turns "on" is the time when the signal of the (n+1)-th column is provided. Simultaneously, it is the time when the horizontal scanning pulse $V_{ox(n)}$ of the n-th column turns "off". In short, in the prior-art example, as apparent from FIGS. 3E and 3F, when the signal of the photodiode of the (n+1)-th column is provided, some $Q_R$ 32 of the signal charges of the n-th column having been trapped under the gate 19 of the horizontal switching MOS transistor 5 of the n-th column are provided. If the residual charges $Q_R$ are equal in all the columns, there will be no problem, but when they are unequal, they form one cause for the fixed pattern noise.

As a result, normal video signals cannot be obtained in the solid-state imaging device, and vertical stripes appear on a reproduced picture screen and spoil the picture quality seriously.

SUMMARY OF THE INVENTION

This invention has for its object to improve the disadvantage of the prior-art solid-state imaging device as stated above, and to provide a solid-state imaging device which includes a signal processing circuit for removing the fixed pattern noise attributed to the residual charges.

That is, an object of this invention is to provide a solid-state imaging device which is free from the appearance of the vertical stripes on a reproduced picture screen ascribable to the fixed pattern noise.

In order to accomplish the object, this invention consists in a solid-state imaging device having a sensor part in which optical signals detected in a plurality of photoelectric conversion elements disposed in a surface region of a semiconductor body are read out through first switching elements that are turned "on" and "off" by discontinuous scanning pulses, and an amplifier which amplifies output signals of the sensor part, characterized by comprising a feedback circuit which feeds an output of said amplifier back to an input end thereof, and a second switching element which is disposed midway in said feedback circuit and also a third switching element which is disposed between an output end of said amplifier and an amplified signal-output terminal of said solid-state imaging device, said second and third switching elements being rendered conductive when said first switching elements are non-conductive.

BRIEF DESCRIPTION OF THE DRAWINGS

FIG. 1A is a schematic circuit diagram showing the outline of a solid-state imaging device.

FIG. 1B is a pulse timing chart showing vertical scanning pulses $V_{oy(N)}$ and horizontal scanning pulses $V_{ox(N)}$ which are employed in the solid-state imaging device of FIG. 1A.

FIG. 6 is a pulse timing chart showing a horizontal scanning pulse and an output signal of the solid-state imaging device.

FIG. 7A is a circuit diagram showing a signal processing circuit in which a gate MOS transistor is incorporated in a horizontal signal output line.

FIG. 7B is a pulse timing chart for explaining the operation of the signal processing circuit of FIG. 7A.

DETAILED DESCRIPTION OF THE INVENTION

In order to eliminate the problem of the prior art as above stated and to achieve an enhancement in the performance of the solid-state imaging device, Oba et al. of the inventors of this invention have previously proposed a scanning system in which before the horizontal scanning pulse $V_{ox(n+1)}$ of the (n+1)-th column is turned "on" to read the signal of the (n+1)-th column, the horizontal scanning pulse $V_{ox(n)}$ of the n-th column is turned "off" (Japanese Unexamined Patent Application No. 54-27313, laid open Mar. 1, 1979).

Hereunder, this scanning system will be explained.

Figure 2:
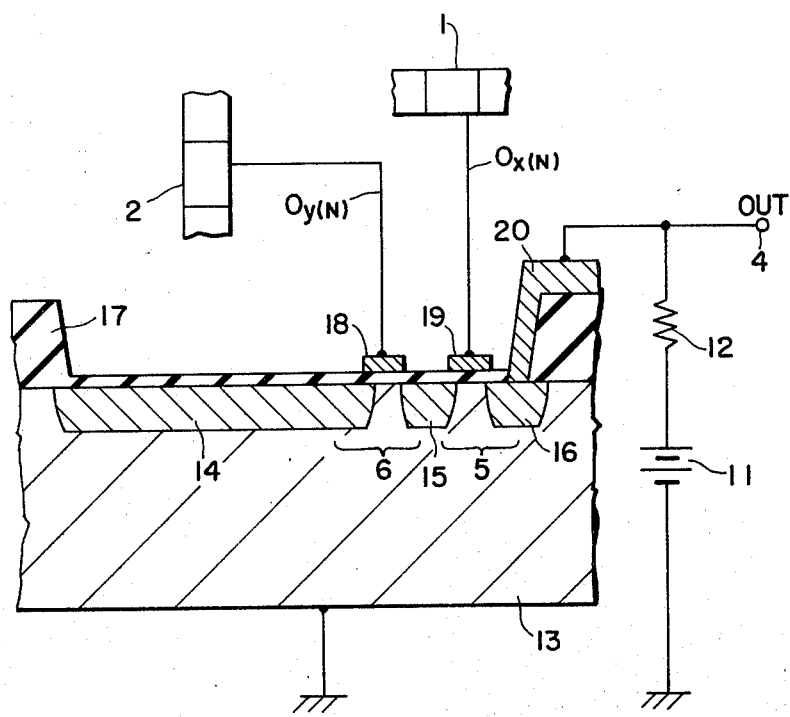
FIG. 2 is a sectional view showing the structure of a photodiode and switching MOS transistors of the solid-state imaging device.
Figure 3A:
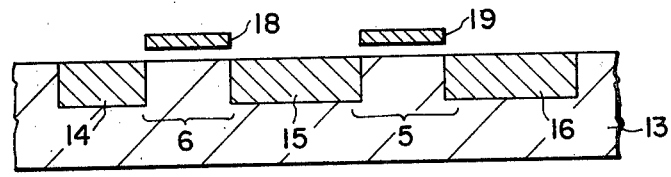
FIG. 3A is a conceptual view of the solid-state imaging device showing the arrangement of the photodiode, the vertical switching MOS transistor and the horizontal switching MOS transistor.
Figure 3B:
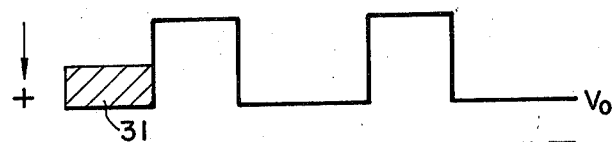
FIGS. 3B, 3C, 3D, 3E and 3F are conceptual diagrams for explaining the transfer of signal charges in the solid-state imaging device.
Figure 3C:
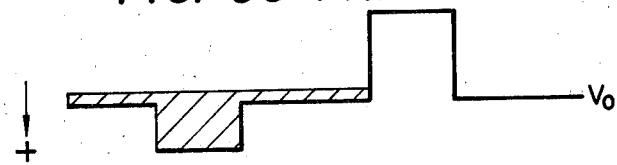
Figure 3D:
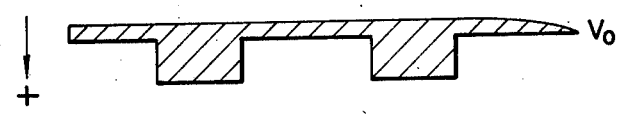
Figure 3E:
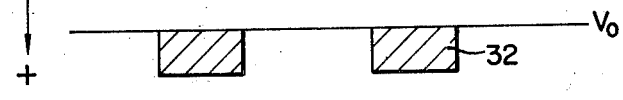
Figure 3F:
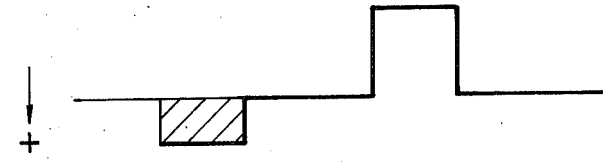
Figure 4A:
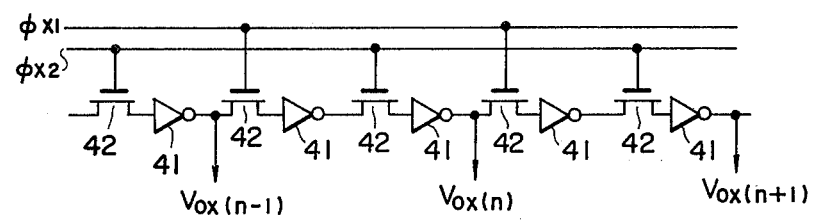
FIG. 4A is a schematic circuit diagram showing a scanning circuit of the solid-state imaging device.
Figure 4B:
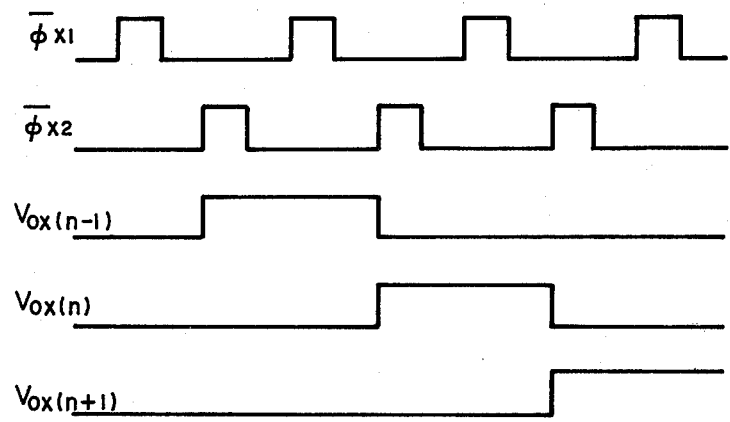
FIG. 4B is a pulse timing chart showing input and output pulses of the scanning circuit of FIG. 4A.
Figure 5A:
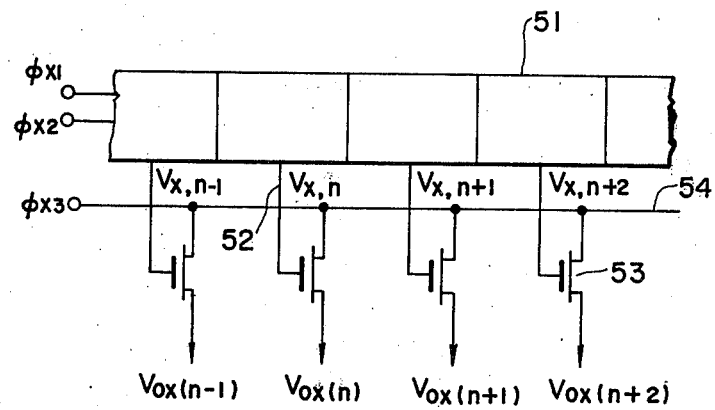
FIG. 5A is a schematic circuit diagram showing a scanning circuit which generates a discontinuous scanning pulse chain.

In FIG. 5A, numeral 51 designates a shift register as shown by way of example in FIG. 4A. Output lines 52 of the shift register are supplied with pulses as shown by $V_{x,n}$ and $V_{x,n+1}$ in FIG. 5B. The scanning circuit of the present example is such that additional gate transistors 53 are disposed between the output lines 52 of the shift register and horizontal switching MOS transistors, and that pulses to be impressed on the gates of the horizontal switching MOS transistors are controlled by clock pulses $\overline{\phi_{x3}}$ which are applied to a drain line 54 of the gate transistors 53.

Figure 5B:
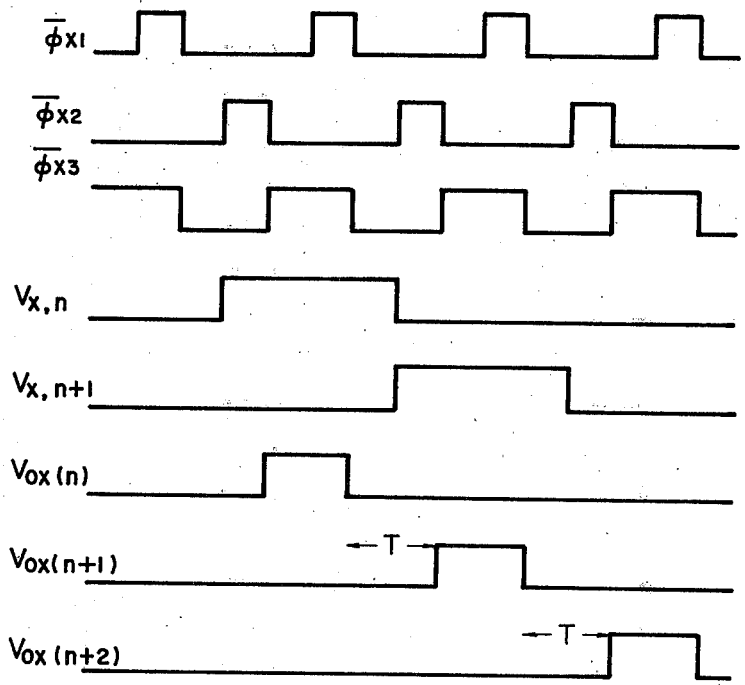
FIG. 5B is a pulse timing chart showing input and output pulses of the scanning circuit of FIG. 5A.

Output pulses $V_{ox(n)}$ of the scanning circuit shown in FIG. 5A become as illustrated in FIG. 5B, and their pulse widths are durations in which the AND between the output pulses $V_{x,n}$ of the shift register and the clock pulses $\overline{\phi_{x3}}$ is established. That is, the output pulses of the scanning circuit form a discontinuous scanning pulse chain (scanning pulse chain having intervals) $V_{ox(n)}$, $V_{ox(n+1)}$ ... in FIG. 5B.

As in the present example, the output pulses of the scanning circuit are such that, after $V_{ox(n)}$ has turned "off", $V_{ox(n+1)}$ turns "on" anew.

When, in the example of FIGS. 5A and 5B, the following relation is held among the high level voltage $V_{XH}$ of the clock pulse $\overline{\phi_{x3}}$, the high level $V_{SH}$ of the output pulse of the shift register 51 and the threshold voltage $V_{th}$ of the gate transistor (MOS transistor) 53:

$$V_{SH} - V_{th} \geqq V_{XH}$$

then the gate transistor operates in its non-saturation region. Thus, it is possible to equalize the output waveforms, especially output signal amplitudes, of the outputs $V_{ox(n)}$, $V_{ox(n+1)}$ ... of the scanning circuit, and the effect of the present scanning system increases more.

The signal readout period becomes the pulse width of $V_{ox(n)}$, i.e., the width of $\overline{\phi_{x3}}$, and it is also possible to suitable adjust this width.

In the solid-state imaging device including the scanning circuit according to which the horizontal scanning pulse chain is made the discontinuous scanning pulse chain having interval times T in order to prevent the fixed pattern noise as described previously, a signal processing circuit must take out only a minute signal 64 (refer to FIG. 6) with a phase shift from a noise 63 due to a pulse displacement current (attributed to a parasitic capacitance between the gate and drain of the HTr) of an output signal (62 in FIG. 6, and the output signal in the presence of the signal charges is indicated by a broken line, while that in the absence of the same is indicated by a solid line) based on the discontinuous horizontal scanning pulse (61 in FIG. 6).

FIG. 7A shows a signal processing circuit which several of the inventors of the present invention have previously proposed (Japanese Patent Application No. 54-18343 filed Feb. 21, 1979, not laid open yet, and pending in the United States as application Ser. No. 120,115, filed Feb. 11, 1980. Numeral 71 designates a signal switching gate element which is disposed between the horizontal signal output line 10 and the output terminal 4, and which is a MOS transistor easy of formation in this case. FIG. 7B is a time chart showing a horizontal scanning pulse waveform 73, a voltage pulse waveform 74 which is applied to the gate 72 of the MOS transistor 71, a waveform 75 of a voltage variation on the horizontal signal line 10, and a signal waveform 76 which is obtained at the output terminal 4. Broken lines 77 and 78 correspond to the case where the signal charges exist.

Further, numeral 70 indicates a pre-amplifier, numeral 79 a feedback resistance which constructs a feedback circuit for reducing noise, symbol 4' an output terminal of an amplified signal, numeral 702 a capacitance of the horizontal signal output line (parasitic capacitance or additional capacitance), and numeral 703 a capacitance.

The MOS transistor 71 is turned "on" after the horizontal switching MOS transistor 5 has turned "off" (the voltage of the signal line 10 has been liberated from the influence of the parasitic capacitance indicated at 701 and has returned to the original state), and it is turned "off" before the next horizontal switching MOS transistor turns "on". While the horizontal scanning pulse is applied, the horizontal signal output line 10 and the output terminal 4 or a load resistance 12 are electrically shut off, and hence, quite no current flows, so that the influences of the scanning pulse waveforms, deviations in the characteristics of the MOS transistors 5, etc. are prevented. As illustrated at 75 in FIG. 7B, a spike noise appears. However, this is based on the switching operation of the single MOS transistor 71 and has no harm on the video signal because it becomes a fixed shape at all times and can be readily removed by a low-pass filter.

Owing to the signal processing circuit of FIG. 7A, the fixed pattern noise disappears completely. Since, however, the switching element is inserted at the stage preceding to the pre-amplifier 70, an increase in random noise (thermal noise) is unavoidable and a satisfactory signal-to-noise ratio is not attained.

Hereunder, this invention will be described in detail with reference to embodiments thereof.

Figure 8:
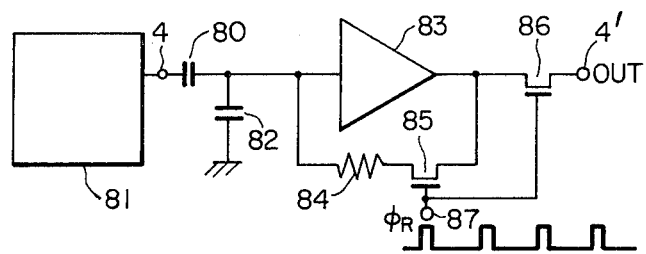
FIGS. 8, 9, 10 and 11 are circuit diagrams each showing a signal processing circuit according to an embodiment of a solid-state imaging device of this invention.

FIG. 8 shows an embodiment of this invention. In the figure, numerals 81 and 82 indicate a sensor part and an output line capacitance $C_o$ (parasitic capacitance or additional capacitance) of a solid-state imaging device respectively. Numeral 80 indicates a capacitance. Numeral 83 denotes a pre-amplifier, numeral 84 a feedback resistance $R_f$, and numerals 85 and 86 signal switching elements. Here, MOS transistors are employed as the signal switching elements.

Now, consider a case where one of the horizontal switching MOS transistors 5 is "on" and where a reset pulse $\phi_R$ impressed on the gates 87 of the MOS transistors 85 and 86 is at its low level. Then, since the signal switching elements 85 and 86 are "off", signal charges are held stored in the output line capacitance $C_o$. At this time, the pre-amplifier is operating, but its output and the feedback circuit are shut off by the signal switching elements 85 and 86. Thereafter, the horizontal switching MOS transistor turns "off" to remove the cause for the generation of the FPN, whereupon the reset pulse $\phi_R$ becomes its high level. Then, the switch 85 turns "on" to render the feedback circuit operative, and also the switch 86 turns "on", so that the signal is normally read out without the influence of the FPN. Since the signal switching elements 85 and 86 are not directly inserted at the input end of the pre-amplifier, the FPN is suppressed, and moreover, the increase of the random noise is small, so that a high signal-to-noise ratio is attained. In general, a MOS transistor involves large 1/f noise. Therefore, in order to lessen the influence of the random noise in the embodiment of FIG. 8, the following is desirable:

$$R_f > R_m$$

where $R_f$ denotes the feedback resistance 84, and $R_m$ the equivalent noise resistance of the switch 85.

Needless to say, in FIG. 8, the signal switching elements 85 and 86 may well be turned "on" and "off" by separate pulses having an overlap period therebetween.

Figure 9:
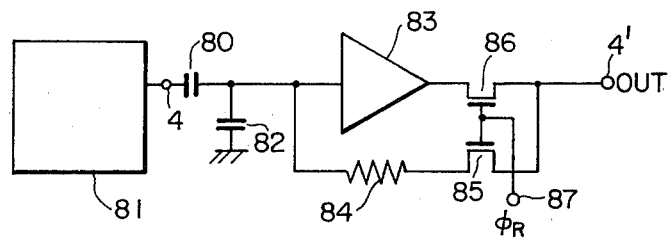

FIG. 9 shows another embodiment. Only the connection of the output portion of the pre-amplifier 83 is somewhat different, and the operating principle is quite the same as in FIG. 8.

Figure 10:
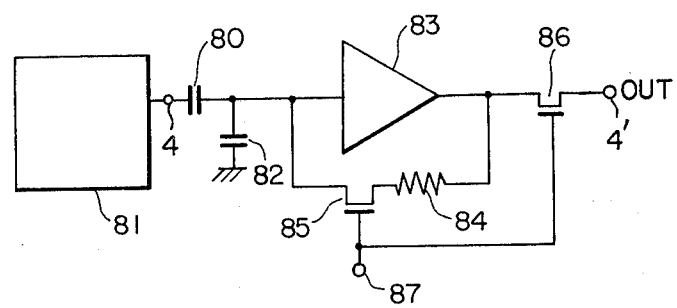

In another embodiment shown in FIG. 10, the positions of the resistance and the switch of the feedback circuit are changed. Also here, it goes without saying that the following is desirable:

$$R_f > R_m$$

Figure 11:
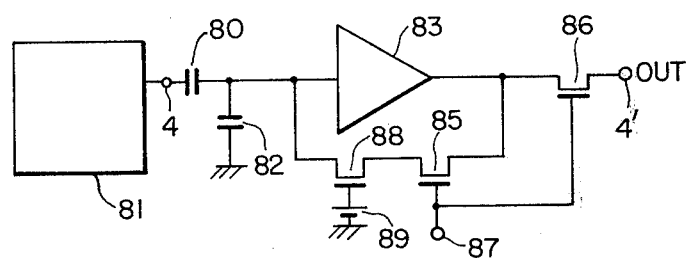

In an embodiment in FIG. 11, the resistance of another MOS transistor 88 (89: gate bias voltage source) is utilized. This is more effective when the peripheral circuits such as pre-amplifier are integrated on the same substrate as that of the sensor employing the MOS transistors. In this case, large quantities of random noise appear from the MOS transistors to be switched. It is therefore desirable that the resistance of the MOS transistor for the switching is made as low as possible and lower than the resistance of the MOS transistor used instead of the feedback resistor.

According to the embodiment of FIG. 11, a pulse noise ascribable to the reset pulse is remarkably reduced owing to the shield effect of the MOS transistor employed in place of the feedback resistor.

In the above embodiments, the MOS transistor has been exemplified as the signal switching element, but it is a matter of course that the invention is not restricted thereto. Insofar as an equivalent switching operation can be effected, any other means may be adopted such as junction type field effect transistor (JFET), bipolar transistor, p-n diode, and any combination thereof including the MOS transistor.

It is to be understood that, in this invention, the feedback circuit may be constructed of any other element than the resistor.

What is claimed is:

1. A solid-state imaging device having a sensor part in which optical signals detected in a plurality of photoelectric conversion elements disposed in a surface region of a semiconductor body are read out through first switching elements that are turned "on" and "off" by discontinuous scanning pulses having fixed interval times, and an amplifier which amplifies output signals of the sensor part, characterized by a feedback circuit connected between an output and input of said amplifier for feeding output signals of said amplifier back to said input thereof, a second switching element connected in said feedback circuit, and a third switching element connected between said output of said amplifier and an amplified signal-output terminal of said solid-state imaging device, said second and third switching elements being rendered conductive when said first switching elements are nonconductive.

2. A solid-state imaging device as defined in claim 1, wherein said feedback circuit includes a resistance, the output signals of said amplifier being fed back to said input thereof through said resistance.

3. A solid-state imaging device as defined in claim 2, wherein said resistance is a resistance between a source and a drain of a MOS transistor.

4. A solid-state imaging device as defined in claim 2 or 3, wherein a resistance value of said resistance is greater than an equivalent resistance value of said second switching element.

5. A solid-state imaging device as defined in claim 1 or 2, wherein said first, second and third switching elements are MOS transistors.

6. A solid-state imaging device as defined in claim 1 or 2, wherein said sensor part comprises photodiodes which are arrayed areally, vertical switching MOS transistors and horizontal switching MOS transistors which transmit optical information stored in said photodiodes, and a vertical scanning circuit and a horizontal scanning circuit which apply scanning pulses successively to gate electrodes of the respective vertical and horizontal switching MOS transistors, wherein said horizontal switching MOS transistors are said first switching elements, and wherein the horizontal scanning pulses which are provided from said horizontal scanning circuit are said discontinuous scanning pulses.

* * * * *